US009681472B2

(12) United States Patent
Sorrentino (10) Patent No.: US 9,681,472 B2
(45) Date of Patent: Jun. 13, 2017

(54) METHOD AND APPARATUS FOR MAPPING IDENTITIES TO DEVICE-TO-DEVICE SYNCHRONIZATION SEQUENCES

(71) Applicant: Telefonaktiebolaget L M Ericsson (publ), Stockholm (SE)

(72) Inventor: Stefano Sorrentino, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 80 days.

(21) Appl. No.: 14/419,863

(22) PCT Filed: Jan. 8, 2015

(86) PCT No.: PCT/SE2015/050005
§ 371 (c)(1),
(2) Date: Feb. 5, 2015

(87) PCT Pub. No.: WO2015/115963
PCT Pub. Date: Aug. 6, 2015

(65) Prior Publication Data
US 2016/0278136 A1    Sep. 22, 2016

Related U.S. Application Data (60) Provisional application No. 61/933,936, filed on Jan. 31, 2014.

(51) Int. Cl.
*H04B 5/00* (2006.01)
*H04B 7/00* (2006.01)
(Continued)

(52) U.S. Cl.
CPC ......... *H04W 76/021* (2013.01); *H04W 4/008* (2013.01); *H04W 56/0015* (2013.01)

(58) Field of Classification Search
CPC .................................................. H04W 76/021
(Continued)

(56) References Cited

U.S. PATENT DOCUMENTS

| 7,925,792 B2* | 4/2011 | Tian ................... H04L 67/1095 709/221 |
| 2004/0044799 A1* | 3/2004 | Sivaraman ........ G06F 17/30578 709/253 |

(Continued)

FOREIGN PATENT DOCUMENTS

| WO | 2015063186 A1 | 5/2015 |
| WO | 2015115977 A1 | 8/2015 |

OTHER PUBLICATIONS

Unknown, Author, "Configuration and Reception of D2D Synchronization and Control Channels", 3GPP TSG-RAN WG1 #75, R1-135554, BlackBerry UK Limited, San Francisco, California, USA, Nov. 11-15, 2013, 1-5.

(Continued)

*Primary Examiner* — Tilahun B Gesesse
(74) *Attorney, Agent, or Firm* — Murphy, Bilak & Homiller, PLLC (57) ABSTRACT

In one aspect of the teachings herein, Device-to-Device, D2D, synchronization signals are generated as a function of an abbreviated identifier associated with the D2D synchronization signals, e.g., the abbreviated identifier serves as a synchronization reference identifier or as an abbreviated device identifier for the wireless device transmitting the D2D synchronization signals. Advantageously, the abbreviated identifier is derived from a full identifier, e.g., a full-length device identifier taken from a full identifier space that is larger than the numeric range represented by the abbreviated identifier space. Use of the abbreviated identifier with its smaller numeric range results in more robust synchronization sequence detection at a receiver, and (Continued)

requires less complexity than would be required if sequence detection operated over the full identifier space.

29 Claims, 6 Drawing Sheets (51) Int. Cl.
H04B 15/00 (2006.01)
H04W 76/02 (2009.01)
H04W 4/00 (2009.01)
H04W 56/00 (2009.01)

(58) Field of Classification Search
USPC .................................. 455/41.2, 41.1, 502
See application file for complete search history.

(56) References Cited

U.S. PATENT DOCUMENTS

| | | | |
|---|---|---|---|
| 2013/0308551 A1* | 11/2013 | Madan .............. | H04W 72/0406 370/329 |
| 2014/0233475 A1* | 8/2014 | Ro ..................... | H04W 76/023 370/329 |
| 2016/0149660 A1* | 5/2016 | Seo ................... | H04W 56/0015 370/336 |
| 2016/0205678 A1* | 7/2016 | Fujishiro ............ | H04W 72/048 370/254 |
| 2016/0212724 A1* | 7/2016 | Seo ................... | H04W 56/0025 |

OTHER PUBLICATIONS

Unknown, Author, "Discussion on design of D2DSS and PD2DSCH", 3GPP TSG RAN WG1 Meeting #75, R1-135479, LG Electronics, San Francisco, California, USA, Nov. 11-15, 2013, 1-6.
Unknown, Author, "On Scrambling of D2D Physical Channels", 3GPP TSG RAN WG1 Meeting #75, R1-135805, Ericsson, San Francisco, California, USA, Nov. 11-15, 2013, 1-5.
Unknown, Author, "Synchronization Design for D2D communication", 3GPP TSG RAN WGI Meeting #75, R1-135175, Alcatel-Lucent, Alcatel-Lucent Shanghai Bell, San Francisco, California, USA, Nov. 11-15, 2013, 1-4.
Unknown, Author, "Synchronization Procedures for D2D Discovery and Communication", 3GPP TSG RAN WG1 Meeting #75, R1-135803, Ericsson, San Francisco, California, USA, Nov. 11-15, 2013, 1-6.
Unknown, Author, "Synchronization Signals and Channel Design for D2D", 3GPP TSG RAN WG1 Meeting #77, R1-142409, Ericsson, Seoul, Korea, May 19-23, 2014, 1-8.
Unknown, Author, "Synchronization Signals and Channel Design for D2D Discovery and Communication", 3GPP TSG RAN WG1 Meeting #76, R1-140774, Ericsson, Prague, Czech Republic, Feb. 10-14, 2014, 1-7.
Unknown, Author, "RAN1 Chairman's Notes", 3GPP TSG RAN WG1 Meeting #74bis, Guangzhou, China, Oct. 7-11, 2013, 1-45.
Unknown, Author, "RAN1 Chairman's Notes", 3GPP TSG RAN WG1 Meeting #73, Fukuoka, Japan, May 20-24, 2013, 1-52.

* cited by examiner

METHOD AND APPARATUS FOR MAPPING IDENTITIES TO DEVICE-TO-DEVICE SYNCHRONIZATION SEQUENCES

TECHNICAL FIELD

The present invention generally relates to wireless communication networks, and particularly relates to the use of synchronization sequences in such networks, including device-to-device synchronization sequences.

BACKGROUND

Device-to-device communication is a well-known and widely used component of many existing wireless technologies, including ad hoc and cellular networks. Examples include Bluetooth and several variants of the IEEE 802.11 standards suite, such as WiFi Direct. These example systems operate in unlicensed spectrum.

Recently, the use of device-to-device or "D2D" communications as an underlay to cellular networks has been proposed as a means to take advantage of the proximity of wireless devices operating within the network, while also allowing devices to operate in a controlled interference environment. In one suggested approach, D2D communications share the same spectrum as the cellular system, for example, by reserving some of the cellular uplink resources for D2D communications use. However, dynamic sharing of the cellular spectrum between cellular services and D2D communications is a more likely alternative than dedicated reservation, because cellular spectrum resources are inherently scarce and because dynamic allocation provides greater network flexibility and higher spectrum efficiency.

The Third Generation Partnership Project or "3GPP" refers to Network Controlled D2D as "Proximity Services" or ProSe, and efforts aimed at integrating D2D functionality into the Long Term Evolution, LTE, specifications are underway. The ProSe Study Item or "SI" recommends supporting D2D operation between wireless devices—referred to as user equipments, or UEs, by the 3GPP—that are out of network coverage, and between in-coverage and out-of-coverage wireless devices. In such cases, certain UEs may regularly transmit synchronization signals to provide local synchronization to neighboring wireless devices.

The ProSe SI also recommends supporting inter-cell D2D scenarios, where UEs camping on possibly unsynchronized cells are able to synchronize to each other. Still further, the ProSe SI recommends that in the LTE context, D2D-capable UEs will use uplink, UL, spectrum for D2D communications, for Frequency Division Duplex, FDD, cellular spectrum, and will use UL subframes from Time Division Duplex, TDD, cellular spectrum. Consequently, the D2D-capable UE is not expected to transmit D2D synchronization signals—denoted as D2DSS—in the downlink, DL, portion of the cellular spectrum. That restriction contrasts with network radio nodes or base stations, referred to as eNodeBs or eNBs in the 3GPP LTE context, which periodically transmit Primary Synchronization Signals, PSS, and Secondary Synchronization Signals, SSS, on the downlink.

The PSS/SSS, as transmitted by the network base stations, enable UEs to perform cell search operations and to acquire initial synchronization with the cellular network. The PSS/SSS are generated based on pre-defined sequences with good correlation properties, in order to limit inter-cell interference, minimize cell identification errors and obtain reliable synchronization. In total, 504 combinations of PSS/SSS sequences are defined in LTE and are mapped to as many cell IDs. UEs that successfully detect and identify a sync signal are thus able to identify the corresponding cell-ID, too.

Figure 1:
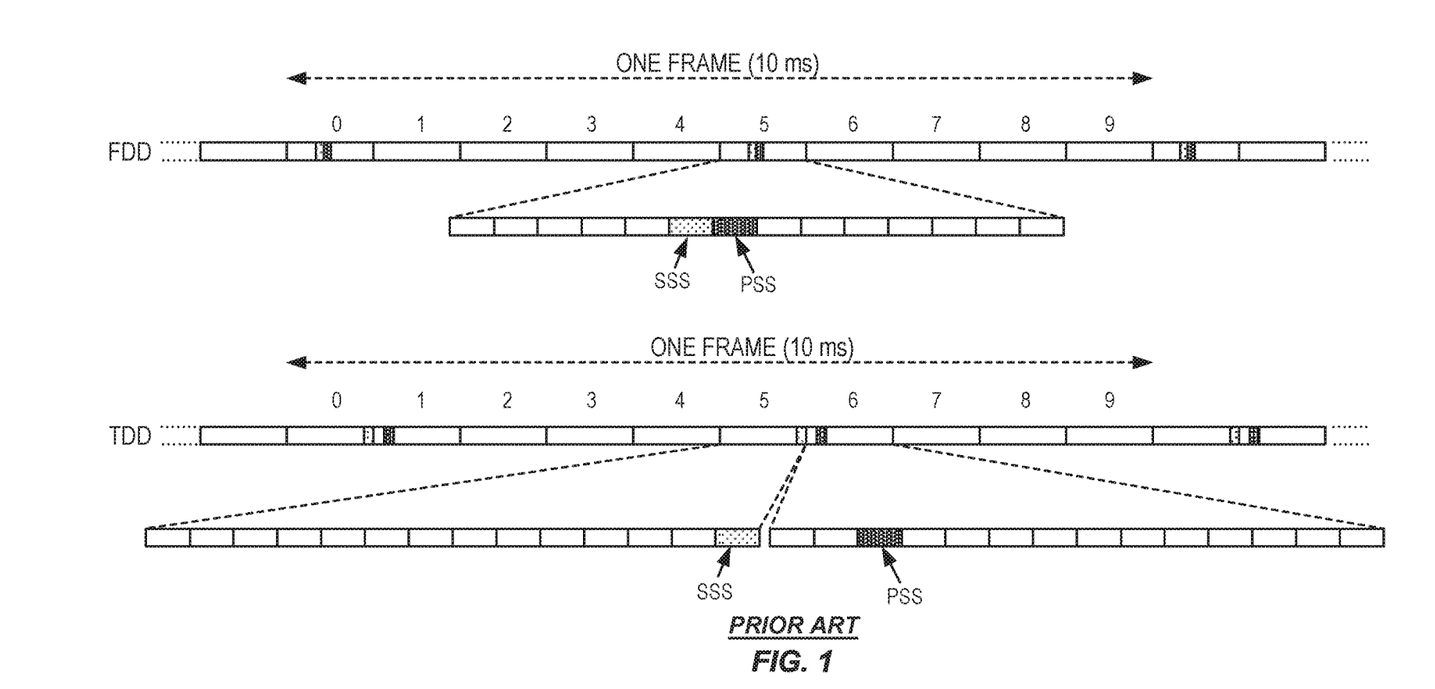
FIG. 1 is diagram illustrating the known transmission timing for primary and secondary synchronization signals transmitted on the downlink in a Long Term Evolution, LTE, network for Time Division Duplex, TDD, and Frequency Division Duplex, FDD, modes.
Figure 2:
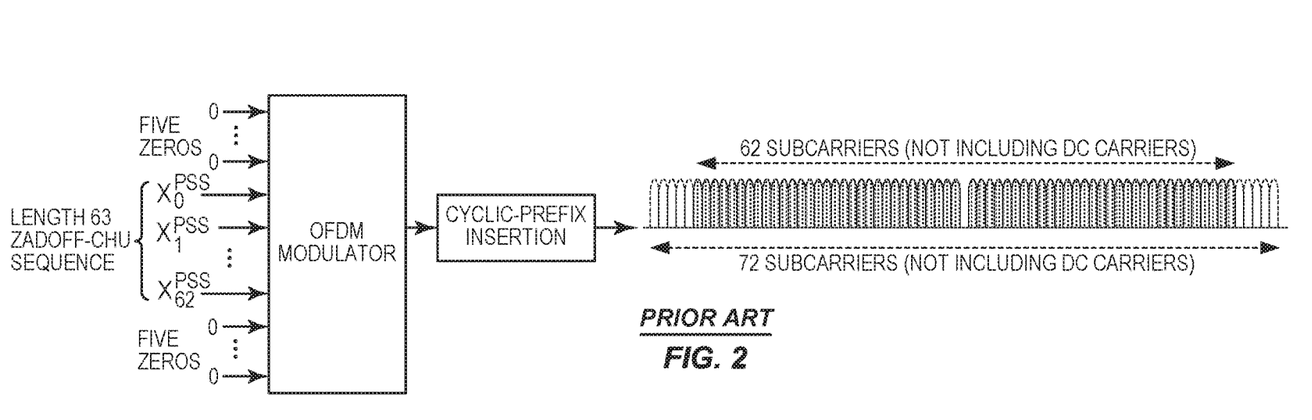
FIG. 2 is a diagram illustrating the generation and structure of a primary synchronization signal, as is known for network base stations operating in an LTE network.

To better appreciate the PSS/SSS configurations used by eNBs on the DL in LTE networks, FIG. 1 illustrates time positions for PSS and SSS in the case of FDD and TDD spectrums. FIG. 2 illustrates PSS generation and the resulting signal structure, FIG. 3 illustrates SSS generation and the resulting signal structure.

FIG. 2 particularly highlights the formation of PSS using Zadoff-Chu sequences. These codes have zero cyclic autocorrelation at all nonzero lags. Therefore, when a Zadoff-Chu sequence is used as a synchronization code, the greatest correlation is seen at zero lag—i.e., when the ideal sequence and the received sequence are synchronized. As noted, FIG. 3 illustrates SSS generation and the resulting signal structure. In LTE, the PSS as transmitted by an eNB on the downlink is mapped into the first 31 subcarriers on either side of the DC subcarrier, meaning that the PSS uses six resource blocks, with five reserved subcarriers on each side, as shown in the following figure. Effectively, the PSS is mapped on to the middle 62 subcarriers of the OFDM resource grid at given symbol times, where "OFDM" denotes Orthogonal Frequency Division Multiplexing, in which an overall OFDM signal comprises a plurality of individual subcarriers spaced apart in frequency and where each subcarrier at each OFDM symbol time constitutes one resource element.

Figure 3:
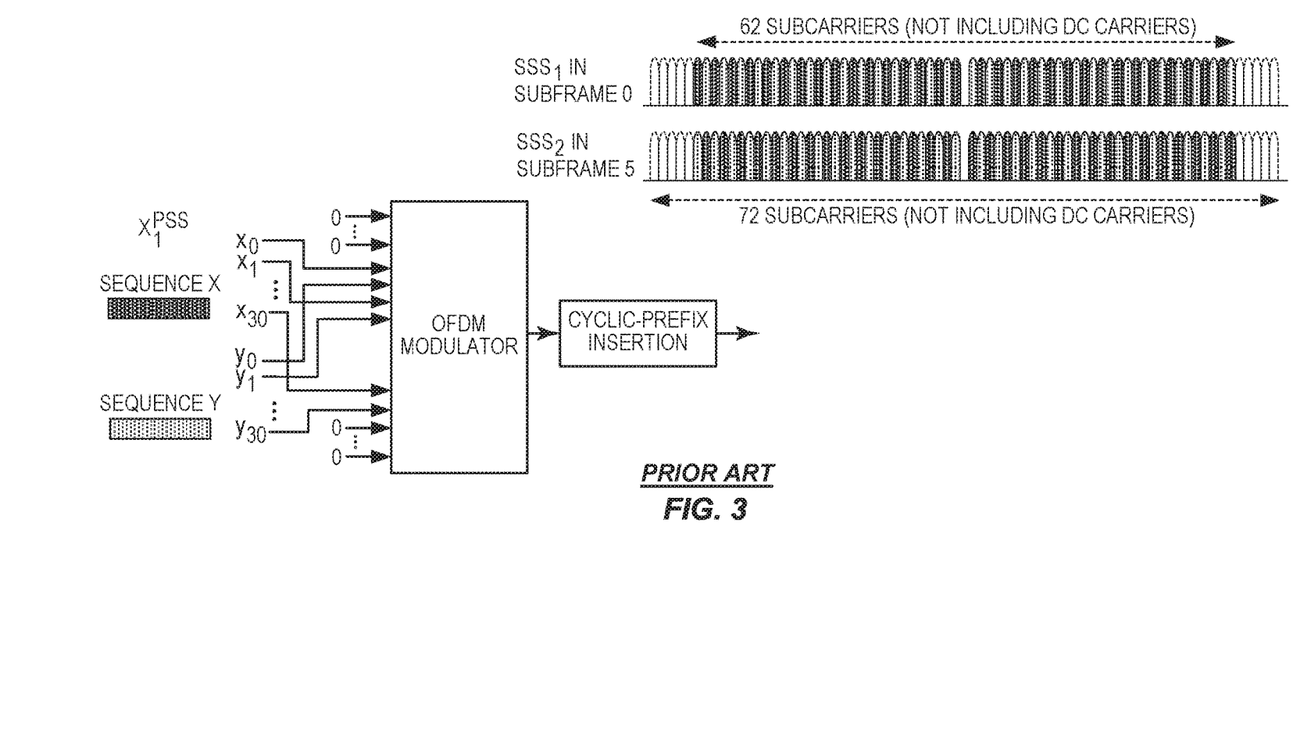
FIG. 3 is a diagram illustrating the generation and structure of a secondary synchronization signal, as is known for network base stations operating in an LTE network.

As FIG. 3 illustrates, the SSS are generated not using Zadoff-Chu sequences, but rather using M sequences, which are pseudorandom binary sequences generated by cycling through each possible state of a shift register. The shift register length defines the sequence length. SSS generation in LTE currently relies on M-sequences of length 31.

With the above in mind, the following equation defines the physical cell ID of a given cell in an LTE network, $$N_{ID}^{CELL} = 3N_{ID}^{(1)} + N_{ID}^{(2)},$$

where $N_{ID}^{(1)}$ is the identity in the group (0 to 167), and where $N_{ID}^{(2)}$ is the identity within the group (0 to 2).

As noted, this arrangement of groups defines a cell identifier space of 504 values. The PSS is linked to the cell identity within the group $N_{ID}^{(2)}$, while the SSS is linked to the cell identity within the group $N_{ID}^{(1)}$ and the cell identity within the group $N_{ID}^{(2)}$. In particular, the PSS is a Zadoff-Chu sequence of complex symbols having length-62. There are three root sequences, indexed by the cell identity within the group $N_{ID}^{(2)}$. As for the SSS, two length-31 sequences are scrambled as a function of the cell identity from the group $N_{ID}^{(1)}$ and from the group $N_{ID}^{(2)}$. A receiver obtains the cell identity conveyed by the PSS and SSS by demodulating the PSS to obtain the value within the group $N_{ID}^{(2)}$ and then uses that knowledge to demodulate the SSS to obtain the value within the group $N_{ID}^{(1)}$.

Because of the desirable properties of the Zadoff-Chu and M sequences used to generate the PSS and SSS in LTE, and because of the preexisting investment in algorithms and associated device-side processing, there is an express interest in reusing these "legacy" PSS/SSS signal generation techniques for D2D Synchronization Signals, D2DSS. Further aspects of D2DSS were considered at the TSG RAN1 #74bis meeting of the Technical Specifications Group or TSG responsible for the Radio Access Network (RAN) in 3GPP. TSG RAN is responsible for defining the functions, requirements and interfaces of the Universal Terrestrial Radio Access Network, UTRAN, and the Evolved UTRAN, E-UTRAN, for both FDD and TDD modes of operation.

The meeting established the following working assumptions, based on a synchronization source transmitting at least a D2D Synchronization Signal or D2DSS, which:

may be used by D2D UEs at least to derive time/frequency;

may also carry the identity and/or type of the synchronization source(s);

comprises at least a Primary D2DSS or PD2DSS, based on a ZC sequence; and may also comprise a Secondary D2DSS or SD2DSS, where the SD2DSS is an M sequence.

Without implying that such a channel will be defined, one may also consider a Physical D2D Synchronization Channel or PD2DSCH, which is contemplated as conveying one or more of the following items of information: identity of the synchronization source; the type synchronization source; resource allocation for data and/or control signaling; and data. A synchronization source in this context is any node transmitting D2DSS. A synchronization source has a physical identity, denoted as PSSID. If the synchronization source is an eNB, the D2DSS is a Rel-8 PSS/SSS. In RAN1#73, "synchronization reference" therefore means the synchronization signal(s) to which "T1" relates, transmitted by one or more synchronization source(s).

Even though a range of different distributed synchronization protocols are possible, one option under consideration by the 3GPP is based on hierarchical synchronization with the possibility of multi-hop sync-relay. In short, some nodes adopt the role of synchronization masters—sometimes referred to as Synchronization Heads, SHs, or as Cluster Heads, CHs—according to a distributed synchronization algorithm. If the synchronization master is a UE, it provides synchronization by transmitting D2DSS and/or PD2DSCH. If the synchronization master is an eNB it provides synchronization by PSS/SSS and broadcast control information, such as being sent using MIB/SIB signaling, where MIB denotes "Master Information Block" and SIB denotes "System Information Block."

The synchronization master is a special case of synchronization source that acts as an independent synchronization source, i.e., it does not inherit synchronization from other nodes by use of the radio interface. UEs that are under coverage of a synchronization source may, according to predefined rules, transmit D2DSS and/or PD2DSCH themselves, according to the synchronization reference received by their synchronization source. They may also transmit at least parts of the control information received from the synchronization master by use of D2DSS and/or PD2DSCH. Such a mode of operation is referred to herein as "sync-relay" or "CP-relay."

It is also helpful to define a "synchronization reference" as a time and/or frequency reference associated with a certain synchronization signal. For example, a relayed synchronization signal is associated with the same synchronization reference as the sync signal in the first hop.

A number of advantages or benefits flow from reusing legacy PSS/SSS for D2DSS sync signals. For example, because UEs must already detect and process PSS/SSS signals transmitted from eNBs in the network, substantially the same algorithms and processing can be reused for detecting D2DSS if the same PSS/SSS sequences are used for D2DSS. However, it is recognized herein that a number of potential issues arise with such reuse.

Consider, for example, the assumption that the cell-ID [0, . . . , 503] identifies a synchronization reference or source provided from an eNB operating in an LTE network. In a similar fashion, one assumes that a D2D identity will be used to identify a synchronization reference or source provided from a D2D-enabled UE. The D2D-identity may be significantly longer than the cell-ID, e.g., 16 bits or more, and it cannot be mapped to the D2DSS without significantly degrading sync detection performance.

In particular, it is recognized herein that in principle a large number of sequences could be defined for D2DSS generation, e.g., a number equal to the full identifier space, but doing so would result in short Euclidean distances between the sequences. Correspondingly, such tight packing would result in poor sequence detection performance. Further, the size of the full identifier space would impose considerable complexity on the receiver, because of the required number of detection hypotheses that would be required.

SUMMARY

In one aspect of the teachings herein, Device-to-Device, D2D, synchronization signals are generated as a function of an abbreviated identifier associated with the D2D synchronization signals, e.g., the abbreviated identifier serves as a synchronization reference identifier or as an abbreviated device identifier for the wireless device transmitting the D2D synchronization signals. Advantageously, the abbreviated identifier is derived from a full identifier, e.g., a full-length device identifier taken from a full identifier space that is larger than the numeric range represented by the abbreviated identifier space. Use of the abbreviated identifier with its smaller numeric range results in more robust synchronization sequence detection at a receiver, and requires less complexity than would be required if sequence detection operated over the full identifier space.

In one example, a method of synchronization signal transmission from a wireless device comprises obtaining an abbreviated identifier based on mapping a full identifier from a full identifier space into an abbreviated identifier space. For example, the full identifier in question is, for example, a full-length device identifier assigned to or otherwise associated with the wireless device. The method further includes generating D2D synchronization signals as a function of the abbreviated identifier, and transmitting the D2D synchronization signals from the wireless device, for D2D synchronization use by one or more other wireless devices. In at least some embodiments, the method further includes transmitting the full identifier in another D2D signal transmitted in association with the D2D synchronization signals, or transmitting information in another D2D signal that allows reconstruction of the full identifier from the abbreviated identifier.

In at least some embodiments, the abbreviated identifier space is the same as or overlaps with a cell identifier space comprising cell identifiers used for identifying cells in the network. Further, generating the D2D synchronization signals as a function of the abbreviated identifier comprises generating the D2D synchronization signals using at least a subset of the same sequences used by base stations in the network for generating network synchronization signals as a function of respective ones of the cell identifiers. Still further, transmitting the D2D synchronization signals from the wireless device includes transmitting the D2D synchronization signals according to one or more transmission characteristics that distinguish them from the network synchronization signals, and thereby enable a receiver to distinguish the abbreviated identifier from the cell identifiers.

In a corresponding example, a wireless device comprises a communication interface configured for communicating with network base stations and with other wireless devices using D2D communications. The wireless device also includes a processing circuit that is operatively associated with the communication interface and configured to obtain an abbreviated identifier, based on mapping a full identifier from a full identifier space into a an abbreviated identifier space. The processing circuit is configured to generate D2D synchronization signals as a function of the abbreviated device identifier, and to transmit the D2D synchronization signals from the wireless device, for D2D synchronization use by one or more other wireless devices. Still further, in at least some embodiments, the processing circuit is configured to transmit the full identifier, or information enabling recovery of the full identifier from the abbreviated identifier, on a D2D signal or channel.

Turning from example transmission details for D2D synchronization signals, the teachings herein also disclose advantageous processing for received synchronization signals. In one example, a method of synchronization signal processing is implemented in a wireless device and comprises receiving synchronization signals generated as a function of an identifier, and determining the identifier from the received synchronization signals. The method further includes deciding whether the identifier is a cell identifier identifying a cell in the network or an abbreviated identifier associated with D2D synchronization, based on identifying one or more transmission characteristics of the received synchronization signals and determining whether the identified transmission characteristics are associated with network synchronization signals or are associated with D2D synchronization signals. Still further, the method includes, when the identifier is determined to be an abbreviated identifier, obtaining a corresponding, full identifier from another D2D signal transmitted in association with the D2D synchronization signals.

In a corresponding example, a wireless device includes a communication interface that is configured for receiving network synchronization signals transmitted from network base stations and D2D synchronization signals transmitted from wireless devices. The wireless device further includes a processing circuit that is operatively associated with the communication interface and configured to determine an identifier from received synchronization signals, where the received synchronization signals were generated as a function of the identifier.

The processing circuit is further configured to decide whether the identifier is a cell identifier identifying a cell in the network or an abbreviated identifier associated with D2D synchronization. The processing circuit makes this decision based on identifying one or more transmission characteristics of the received synchronization signals and determining whether the identified transmission characteristics are associated with network synchronization signals or are associated with D2D synchronization signals. Still further, the processing circuit is configured to obtain a corresponding, full identifier from another D2D signal transmitted in association with the D2D synchronization signals, when the identifier is determined to be an abbreviated identifier.

In an example configuration, the decision is based on identifying one or more transmission characteristics of the received synchronization signals and determining whether the identified transmission characteristics are associated with network synchronization signals or are associated with D2D synchronization signals. Correspondingly, the method further includes, when the identifier is determined to be an abbreviated device identifier, obtaining a corresponding, full-length device identifier from another D2D signal transmitted in association with the D2D synchronization signals.

With respect to the processing immediately above, an example wireless device includes a communication interface configured for receiving network synchronization signals transmitted from network base stations and D2D synchronization signals transmitted from wireless devices, along with a processing circuit that is operatively associated with the communication interface. Here, the processing circuit is configured to receive synchronization signals generated according to an identifier having a value taken from a cell identifier space used for identifying cells within the network, and to determine the identifier from the received synchronization signals.

Still further, the processing circuit is configured to decide whether the identifier is a cell identifier identifying one of the cells in the network or an abbreviated device identifier identifying another wireless device. The decision is based on identifying one or more transmission characteristics of the received synchronization signals and determining whether the identified transmission characteristics are associated with network synchronization signals or are associated with D2D synchronization signals. Additionally, when the identifier is determined to be an abbreviated device identifier, the processing circuit is configured to obtain a corresponding, full-length device identifier from another D2D signal transmitted in association with the D2D synchronization signals.

Of course, the present invention is not limited to the above features and advantages. Those of ordinary skill in the art will recognize additional features and advantages upon reading the following detailed description, and upon viewing the accompanying drawings.

DETAILED DESCRIPTION

Figure 4:
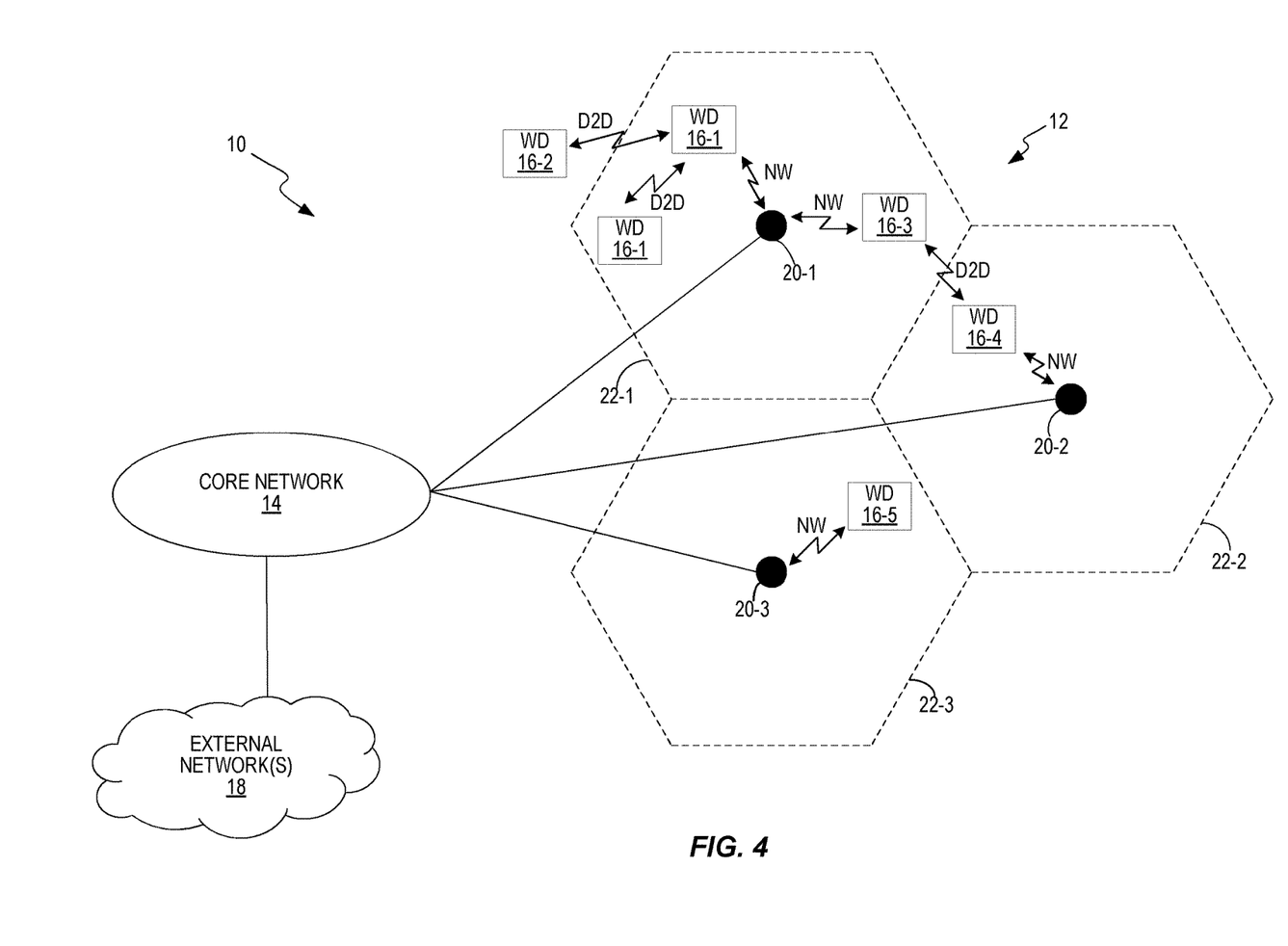
FIG. 4 is a block diagram of one embodiment of a wireless communication network, where one or more wireless devices are configured according to the teachings herein.

FIG. 4 illustrates one embodiment of a wireless communication network 10 that includes a Radio Access Network, RAN, 12 and a Core Network, CN, 14. The network 10 communicatively couples wireless devices 16 to one or more external networks 18, such as the Internet or another packet data network. The diagram is simplified for ease of discussion and it will be appreciated that the network 10 may include additional examples of any one or more of the illustrated entities and may include other entities not illustrated. For example, the CN 14 may include Mobility Management Entities or MMEs, Serving Gateways or SGWs, a Packet Gateway or PGW, and one or more other nodes, such as positioning nodes, Operations & Maintenance nodes, etc.

The RAN 12 includes a number of base stations 20-1, 20-2 and 20-3, which in the LTE context are referred to as eNBs or eNodeBs. Unless suffixes are needed for clarity, the reference number "20" will be used to refer to base stations in the singular and plural senses. Each base station 20 uses certain air interface resources—e.g., spectrum, carriers, channels, etc.—to provide service over a given area, referred to as a "cell." Accordingly, in FIG. 4, the base station 20-1 provides a cell 22-1, the base station 20-2 provides a cell 22-2, and the base station 20-3 provides a cell 22-3. Unless suffixes are needed for clarity, the reference number "22" will be used herein to refer to cells in the singular and plural senses.

Of course, a given base station 20 may provide more than one cell 22, e.g., in the case of multi-carrier operation, and the teachings herein are not limited to arrangement of base stations 20 and cells 22 depicted in FIG. 4. For example, the cell sizes may be adaptive or non-uniform. In the latter case, the network 10 may comprise a heterogeneous network where one or more large cells, referred to as "macro" cells are overlaid by one or more smaller cells, referred to a "micro," "pico," or "femto," cells. These smaller cells are provided by low-power access points and may be used as service hotspots that provide higher data rate services and/or may be used to extend or fill in the service coverage provided by the macro cells. In some heterogeneous deployments, the micro cells use the same radio access technology used by the macro cells, e.g., LTE-based micro cells overlaying LTE-based macro cells.

Figure 5:
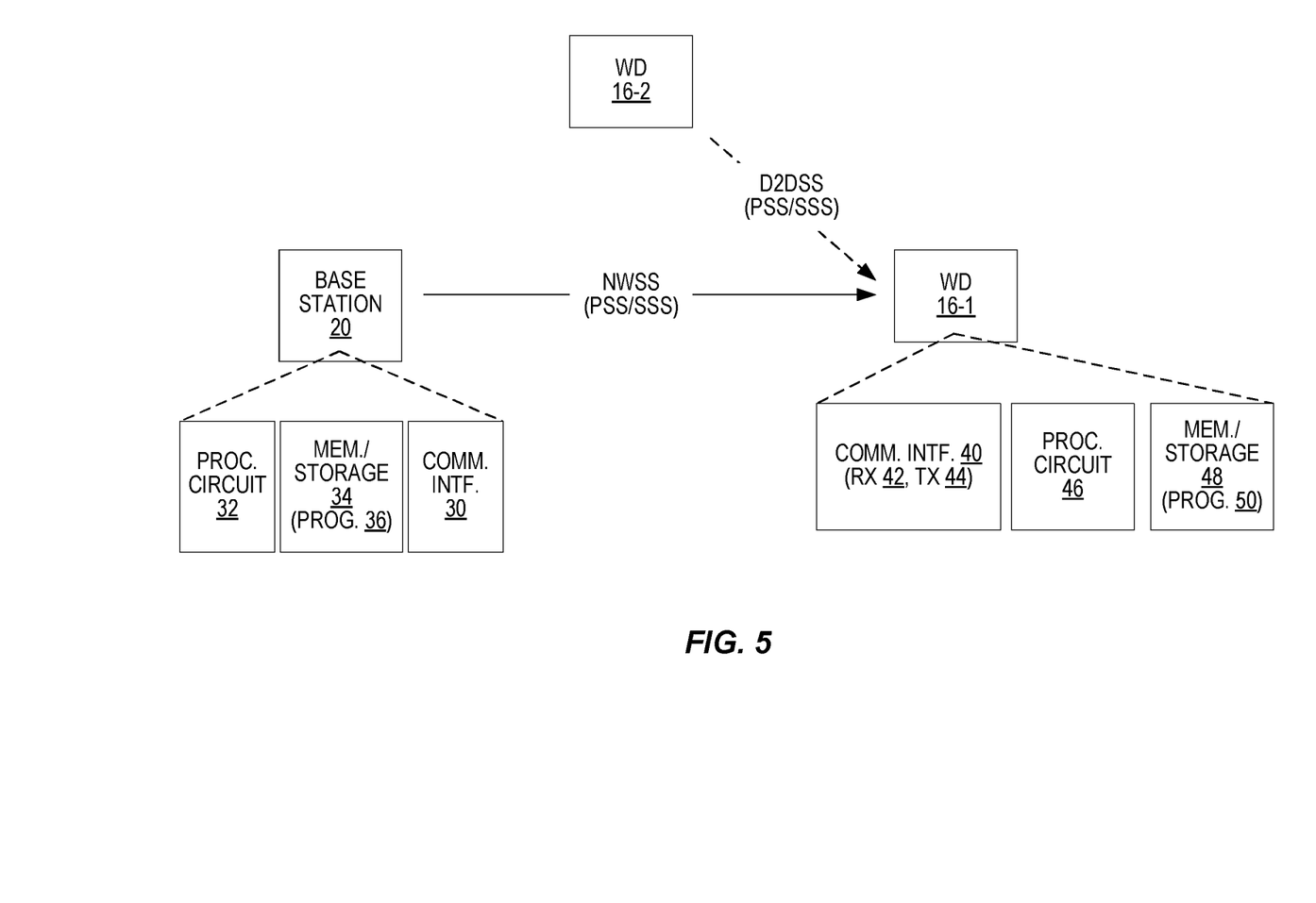
FIG. 5 is a block diagram of one embodiment of example details for a base station, such as an eNB in an LTE network, and a wireless device configured according to the teachings herein.

FIG. 5 illustrates example details for one embodiment of a base station 20 and a wireless device 16-1, which is shown in context with another wireless device 16-2. Those of ordinary skill in the art will appreciate that FIG. 5 illustrates functional and/or physical circuit arrangements and that the base station and the wireless device 16-1 generally will include digital processing circuits—and associated memory or other computer-readable medium—for storing configuration data, operational or working data, and for storing computer program instructions. In at least some of the embodiments contemplated herein, the network-side and device-side functionality is realized at least in part through the programmatic configuration of digital processing circuitry, based on the execution by that circuitry of stored computer program instructions.

One sees from the example that the base station 20 includes a communication interface 30, a processing circuit 32 and associated memory/storage 34, e.g., one or more types of computer-readable medium, such as a mix of volatile, working memory and non-volatile configuration and program memory or storage. The communication interface 30 depends on the nature of the base station 20, but generally includes a radio transceiver, e.g., pools of radio transmission, reception, and processing circuitry, for communicating with any number of wireless devices 16 in any one or more cells 22 provided by the base station 20. In this example, the communication interface 30 includes one or more transmitters and receivers, e.g., cellular radio circuits, along with power control circuitry and associated signal processing circuitry. Further, in the same scenario, the communication interface 30 may include inter-base-station interfaces and/or backhaul or other CN communication interfaces. Thus, the communication interface 30 may include more than one interface type, e.g., a radio interface for communicating with wireless devices 16, and one or more network interfaces for communicating with other base stations and/or the CN.

The processing circuit 32 comprises, for example, digital processing circuitry that is fixed or programmed to perform network-side processing as taught herein. In one embodiment, the processing circuit 32 comprises one or more microprocessors, Digital Signal Processors or "DSPs", ASIC, FPGAs, etc., which are configured according to the teachings herein. In a particular embodiment, the memory/storage 34 stores a computer program 36.

In an example embodiment, the processing circuit 32 is at least partly configured according to the teachings herein, based on its execution of the computer program instructions comprising the computer program 36. In this regard, the memory/storage 34 will be understood as comprising a computer-readable medium providing non-transitory storage for the computer program 36.

Turning to the example wireless device 16-1, the device may be a cellular radiotelephone, such as a smartphone, a feature phone, etc., or may be a tablet or laptop computer, a network adaptor, card, modem or other such interface device. The term "wireless device" thus broadly denotes essentially any device or other apparatus that is configured for wireless communication in the network 10. In the 3GPP context, the wireless device 16-1 is referred to as a UE. Regardless, the wireless device 16 includes a communication interface 40, including a radiofrequency receiver 42 and a radiofrequency transmitter 44 that are configured for operation according to the air interface of the network 10.

The wireless device 16-1 further includes a processing circuit 46, which includes or is associated with memory/storage 48. The memory/storage 48 includes, for example, one or more types of computer-readable medium, such as a mix of volatile, working memory and non-volatile configuration and program memory or other storage. Similarly, those of ordinary skill in the art will appreciate that the communication interface 40 may comprise a mix of analog and digital circuits. For example, the receiver 42 in one or more embodiments comprises a receiver front-end circuit—not explicitly shown in the diagram—that generates one or more streams of digital signal samples corresponding to antenna-received signal or signals, along with one or more receiver processing circuits—e.g., baseband digital processing circuitry and associated buffer memory—which operate on the digital samples. Example operations include linearization or other channel compensation, possibly with interference suppression, and symbol demodulation/detection and decoding, for recovering transmitted information.

At least some of the digital baseband processing for the receive or "RX" signals and transmit or "TX" signals received and transmitted through the communication interface 40 may be implemented in the processing circuit 46. The processing circuit 46 in this regard comprises digital processing circuitry and may be implemented as one or more microprocessors, DSPs, ASICs, FPGAs, etc. More generally, the processing circuit 46 may be implemented using fixed circuitry or programmed circuitry. In an example embodiment, the memory/storage 48 comprises a computer-readable medium that stores a computer program 50 in a non-transitory manner. The processing circuit 46 in such embodiments is at least partly configured according to the teachings herein, based on its execution of the computer program instructions comprising the computer program 50.

Note that with respect to transmit-related details herein for the transmission of D2D synchronization signals from a wireless device 16, the wireless device 16-2 shown in FIG. 5 may be understood as having the same or similar implementation as the wireless device 16-1. In other words, the processing circuit 46 and other supporting circuitry within any given wireless device 16 may be configured to carry out the synchronization signal receive processing taught herein and/or the synchronization signal transmit processing taught herein.

For ease of reference in the further examples given below, the following summary of terms and understandings apply:
NWSS denotes network synchronization signals, i.e., PSS and SSS as transmitted by a base station 20;
D2DSS denotes D2D synchronization signals, i.e., PSS and SSS as transmitted by a wireless device 16;
PSS and SSS denote primary and secondary synchronization signals, irrespective of whether they are NWSS or D2DSS;
PD2DSS denotes a PSS as transmitted by a wireless device 16;
SD2DSS denotes a SSS as transmitted by a wireless device 16; and
PD2DCH denotes any control or data channel transmitted directly from a D2D-capable wireless device 16 and targeting one or more other wireless devices 16.

Figure 6:
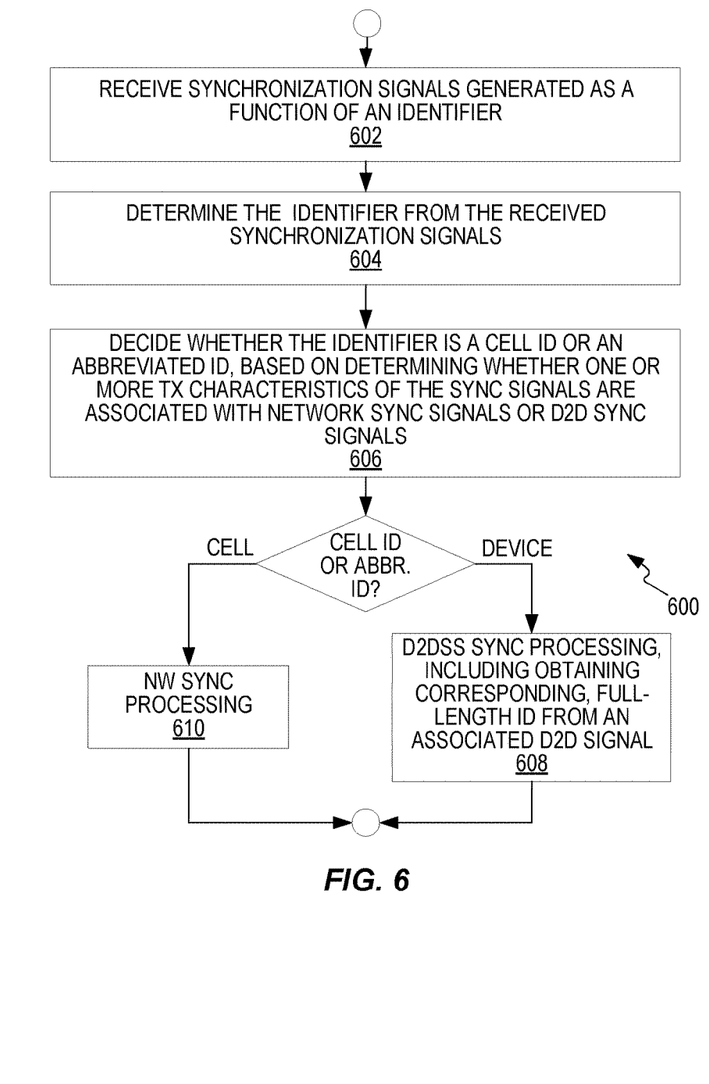
FIG. 6 is a logic flow diagram of one embodiment of a method of processing received synchronization signals at a wireless device.

With respect to example details for synchronization signal receive processing as contemplated for a wireless device 16 or other receiver herein, FIG. 6 illustrates an example embodiment of a method 600 of processing received synchronization signals. It will be appreciated that the processing indicated in FIG. 6 may be implemented at least in part via programmatic configuration, based on the execution of stored computer program instructions, e.g., by the execution of the stored computer program 50 by the processing circuit 46, as shown in FIG. 5 for the wireless device 16-1.

It will also be appreciated that FIG. 6 does not necessarily imply a specific or required processing order and that one or more of the illustrated method steps may be performed in an order different from the illustration. Further, the method 600 or included steps therein may be performed in parallel, repeated or otherwise looped on a periodic or triggered basis, and/or may be performed in an ongoing sense, e.g., as part of ongoing or background processing.

The method 600 includes receiving synchronization signals generated as a function of an identifier (Block 602), and determining (Block 604) the identifier from the received synchronization signals, and deciding (Block 606) whether the identifier is a cell identifier identifying a cell in the network or an abbreviated device identifier identifying another wireless device 16. For example, the wireless device 16 identifies one or more transmission characteristics of the received synchronization signals and determines whether the identified transmission characteristics are associated with NWSS or are associated with D2DSS.

In this regard, it will be understood that the wireless device 16 knows or is told which transmission characteristics are associated with D2DSS and/or which transmission characteristics are associated with NWSS. In one example, the received synchronization signals comprise a PSS and an SSS, and the transmit order of the PSS and SSS indicate whether the PSS and SSS are NWSS or D2DSS. In another example, the symbol spacing of PSS and SSS indicates whether the PSS and SSS are NWSS or D2DSS. In another example, the mapping of SSS and/or PSS onto the time-frequency resources of the signal conveying the SSS and the PSS indicates whether the PSS and SSS are NWSS or D2DSS.

The method 600 further includes, when the identifier is determined to be an abbreviated identifier, obtaining (Block 608) a corresponding, full identifier from another D2D signal transmitted in association with the D2DSS. For example, the wireless device 16 obtains a full-length device identifier of the wireless device 16 transmitting the D2D synchronization signals, from another D2D signal transmitted by such other device 16. Such processing may be part of overall processing associated with the reception of D2DSS. Conversely, if the identifier is determined to be a cell ID, then processing continues from Block 606 with performing processing associated with the reception of NWSS (Block 610). Here, it will be appreciated that the wireless device 16 may use different procedures and/or rules for processing and using NWSS as compared to D2DSS.

In some embodiments, obtaining (Block 608) the corresponding full identifier comprises obtaining the full identifier from a control channel or other signal transmitted in association with the D2D synchronization signals. For example, the corresponding full identifier is transmitted on a PD2DSCH associated with the received D2DSS. In other embodiments, obtaining (Block 608) the corresponding full identifier comprises obtaining information from a control channel or other signal transmitted in association with the D2DSS, and reconstructing the full identifier using the obtained information and the abbreviated identifier. If the received synchronization signals are NWSS, the method 600 includes performing NWSS processing (Block 610).

In the same or other embodiments, the method 600 includes using the abbreviated identifier to unscramble one or more signals transmitted in association with the D2D synchronization signals. That is, the involved transmitter uses the abbreviated identifier to scramble one or more D2D signals transmitted in association with the D2D synchronization signals, and the receiving wireless device 16 uses the abbreviated identifier as determined from the D2D synchronization signals to unscramble the associated, scrambled D2D signals.

It will be appreciated that a wireless device 16, such as 16-1 or 16-2 shown in FIG. 5, may be configured to perform the method 600 or variations of it. In one embodiment, the wireless device 16 is configured for operation in a wireless communication network 10 and its communication interface 40 is configured for receiving NWSS transmitted from network base stations 20 and D2DSS transmitted from other wireless devices 16. Further, the processing circuit 46 of the wireless device 16 is operatively associated with the communication interface 40 and is configured to: determine an identifier from received synchronization signals generated as a function of the identifier. For example, the processing circuit 46 performs demodulation and identifier detection using the same or substantially the same processing as used for detection of PSS/SSS as transmitted by eNBs in accordance with LTE specifications.

The processing circuit 46 is further configured to decide whether the identifier is a cell identifier identifying one of the cells 22 in the network 10 or an abbreviated identifier associated with D2DSS transmission. The decision is based on identifying one or more transmission characteristics of the received synchronization signals and determining whether the identified transmission characteristics are associated with NWSS or are associated with D2DSS. When the identifier is determined to be an abbreviated identifier, the processing circuit 46 obtains a corresponding, full identifier from another D2D signal transmitted in association with the D2DSS. That is, once the processing circuit 46 recognizes that the identifier is an abbreviated identifier, rather than a conventional cell identifier, the processing circuit 46 knows to obtain the full identifier, which may be device ID, from one or more signals transmitted in association with the D2DSS. Here, "signal" denotes any physical or logical signal or channel.

As a consequence of the above processing configuration, identifiers that generally will be too long—too great in magnitude—to fit within the cell identifier space defined for cell IDs, can be abbreviated to fit within the cell identifier space. Doing so advantageously allows a wireless device 16 to derive an abbreviated identifier from its longer device identifier, to generate PSS/SSS for D2DSS transmission in the same or substantially the same manner as used by base stations 20 for transmitting PSS/SSS for NWSS transmission. Of course, at least for some embodiments, this arrangement means that the abbreviated identifiers are, without more, indistinguishable from cell IDs of the same numeric value. Thus, as a further aspect of the teachings herein, the D2DSS transmissions have one or more transmission characteristics that distinguish from conventional NWSS transmission—e.g., a different ordering, spacing or mapping of the PSS/SSS. The distinguishing characteristic(s) permit a receiver to recognize whether a given identifier as determined from received synchronization signals represents a cell ID or an abbreviated ID.

Figure 7:
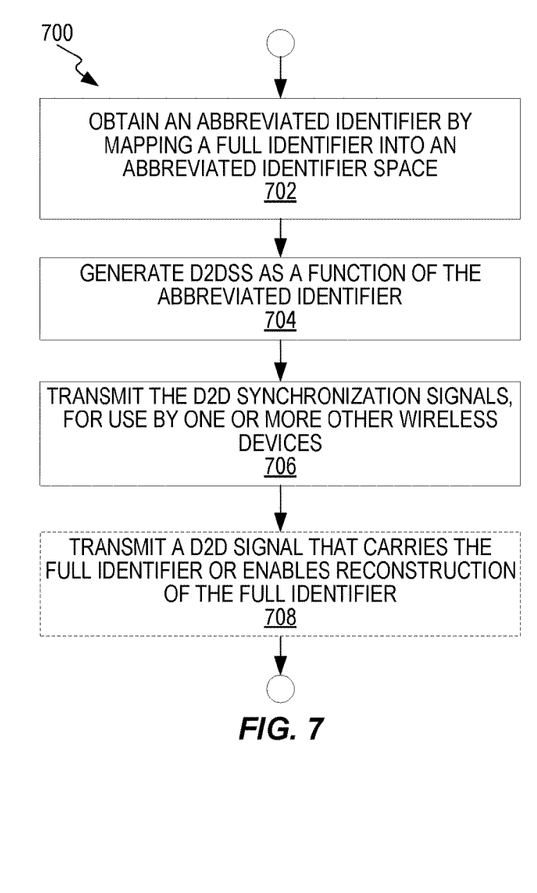
FIG. 7 is a logic flow diagram of one embodiment of a method of transmitting Device-to-Device, D2D, synchronization signals from a wireless device.

FIG. 7 illustrates transmit-related processing in a wireless communication device 16. For example, such processing may be implemented by the device 16-2 shown in FIG. 5 and/or by the device 16-1 shown in FIG. 5, at least for a case where the device 16-1 transmits D2DSS. The method 700 includes obtaining (Block 702) an abbreviated identifier based on mapping a full identifier from a full identifier space into an abbreviated identifier space, generating (Block 704) D2DSS as a function of the abbreviated identifier, and transmitting (Block 706) the D2D synchronization signals from the wireless device, for D2D synchronization use by one or more other wireless devices 16. Thus, the abbreviated identifier serves as an abbreviated device identifier for the wireless device 16, or serves as a synchronization reference identifier for the D2D synchronization signals.

In some embodiments, the abbreviated identifier space is the same as or overlaps with a cell identifier space comprising cell identifiers used for identifying cells 22 in the network 10. In at least one such embodiment, generating the D2DSS as a function of the abbreviated identifier comprises generating the D2DSS using at least a subset of the same sequences used by base stations 20 in the network 10 for generating network synchronization signals as a function of respective ones of the cell identifiers. Further, in such embodiments, transmitting the D2DSS from the wireless device 16 includes transmitting the D2DSS according to one or more transmission characteristics that distinguish them from the network synchronization signals, and thereby enable a receiver to distinguish the abbreviated identifier from the cell identifiers.

For example, transmitting the D2D synchronization signals according to the one or more transmission characteristics comprises at least one of: transmitting a primary D2D synchronization signal, PD2DSS, and a secondary D2D synchronization signal, SD2DSS, using a symbol spacing or symbol ordering distinct from a defined symbol spacing or defined symbol order used by the network base stations 20 for transmitting primary and secondary network synchronization signals.

In some embodiments, mapping the full identifier from the full identifier space into the abbreviated identifier space comprises performing one or more mathematical operations on the full identifier so as to obtain a reduced-magnitude value as the abbreviated identifier. Here, of course, the reduced-magnitude value fits within the numeric range defined by the abbreviated identifier space. By way of example, the one or more mathematical operations include one or more of: performing a truncation operation on the full identifier, performing a modulo-n operation on the full identifier, where n is an integer value corresponding to the numeric range of the abbreviated identifier space, and performing a hashing operation on the full identifier.

In the same or other embodiments, the method 700 includes transmitting (708) one or more signals in association with the D2D synchronization signals, wherein the one or more signals convey the full identifier or convey information enabling a receiver to reconstruct the full identifier from the abbreviated identifier. Further, the method 700 in some embodiments includes transmitting one or more signals in association with the D2D synchronization signals, wherein the one or more signals are scrambled with the abbreviated identifier.

In at least one embodiment, the wireless device 16 transmits a D2D channel, e.g., a PD2DSCH, carrying the full identifier. Further, in at least some embodiments, a wireless device 16 transmitting D2DSS transmits a PD2DSCH at pre-defined or configured resources with respect to the D2DSS. Correspondingly, an appropriately configured receiver, such as another wireless device 16 configured according to the receiver-side aspects of the teachings herein, knows where/how to find the PD2DSCH in relation to the received D2DSS, and thereby obtain the full identifier corresponding to the abbreviated identifier used to generate the D2DSS.

With the method 700 in mind, a wireless device 16 includes a communication interface 40 that is configured for communicating with network base stations 20 and with other wireless devices 16 using D2D communications, and further includes a processing circuit 46 that is operatively associated with the communication interface 40. The processing circuit 46 is configured to obtain an abbreviated identifier based on mapping a full identifier from a full identifier space into an abbreviated identifier, to generate D2D synchronization signals as a function of the abbreviated identifier, and to transmit the D2D synchronization signals from the wireless device, for D2D synchronization use by one or more other wireless devices 16. The processing circuit 46 may also be configured to implement processing to carry out any further aspects of the method 700, or variations thereof.

Figure 8:
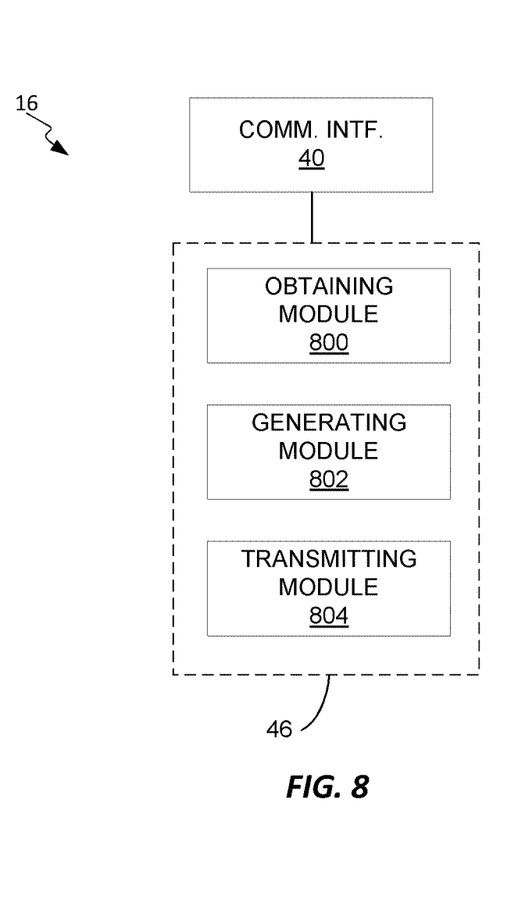
FIG. 8 is a block diagram of one embodiment of functional modules implemented in a wireless device and configured for transmitting D2D synchronization signals from the wireless device.

FIG. 8 illustrates one embodiment of implementing the processing of the method 700, for example, using functional modules 800, 802 and 804 implemented in a wireless device 16. These functional modules are implemented, for example, as functional circuits in the aforementioned processing circuit 46 of the given wireless device 16.

In the example illustration, the wireless device 16 is configured for synchronization signal transmission and includes an obtaining module 800 configured for obtaining an abbreviated identifier based on mapping a full identifier from a full identifier space into an abbreviated identifier space. The wireless device 16 further includes a generating module 802 for generating D2D synchronization signals as a function of the abbreviated identifier, and includes a transmitting module 804 configured for transmitting the D2D synchronization signals from the wireless device 16, for D2D synchronization use by one or more other wireless devices 16. Here, it will be understood that the transmitting module 804 is associated with the communication interface 40, e.g., with the transmitter or TX 44, to carry out the transmission.

Figure 9:
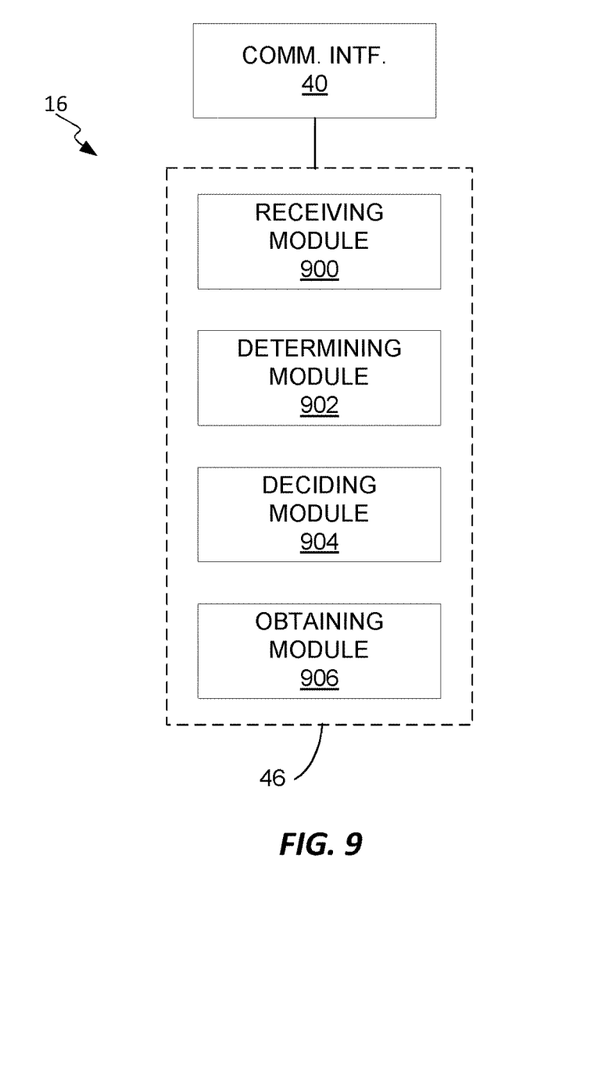
FIG. 9 is a block diagram of one embodiment of functional modules implemented in a wireless device and configured for processing received synchronization signals at the wireless device.

Similarly, FIG. 9 illustrates one embodiment of implementing the processing of the method 600, for example, using functional modules 900, 902 and 904 implemented in the same or another wireless device 16. These functional modules are implemented, for example, as functional circuits in the aforementioned processing circuit 46 of the given wireless device 16.

In the example illustration, the wireless device 16 is configured for synchronization signal processing and includes a receiving module 900 configured for receiving synchronization signals generated as a function of an identifier, and further includes a determining module 902 configured for determining the identifier from the received synchronization signals. Still further, the wireless device 16 includes a deciding module 904 configured for deciding whether the identifier is a cell identifier identifying a cell 22 in the network 10 or an abbreviated identifier associated with D2D synchronization signals. The deciding operation is based on identifying one or more transmission characteristics of the received synchronization signals and determining whether the identified transmission characteristics are associated with network synchronization signals or are associated with D2D synchronization signals. Additionally, the wireless device 16 in this embodiment includes an obtaining module 906 that, when the identifier is determined to be an abbreviated identifier, is configured for obtaining a corresponding, full identifier from another D2D signal transmitted in association with the D2D synchronization signals.

Among their several advantages, the teachings herein allow D2DSS transmission and reception to reuse most of the pre-existing algorithms for LTE PSS/SSS transmission and reception. These advantages are obtained while preventing ambiguity between NWSS and D2DSS and enabling D2DSS and associated signaling to efficiently convey device or other identifiers that are potentially much longer than that provided for by the cell identifier space associated with NWSS, and while providing for D2DSS detection that is more robust in comparison to the use of larger identifier spaces for D2SS generation.

With the above examples, features and operations in mind, one aspect of the teachings herein can be understood as mapping in different ways a device identity to D2DSS and other D2D signals or channels parameters. Additionally, or alternatively, the teachings herein disclose controlling one or more transmission parameters as a function of the type and/or length of the device identity. For example, the PD2DSCH and/or other channels or signals, scheduling assignments, etc. are scrambled using the abbreviated device identifier, which is also used for generating PSS and SSS as the D2DSS. In another example, one or more transmission characteristics of the PSS and SSS are set or determined according to whether the PSS and SSS are being transmitted as NWSS or as D2DSS.

Broadly, according to one embodiment, a full-length identifier is abbreviated, at least whenever its range exceeds a predefined interval, e.g., if the identifier is larger than accommodated by the cell identifier space used in LTE networks. Here, the full-length identifier may be a device identifier but is more broadly understood as a synchronization source, SS, identifier or "SSID" that allows the receiver to distinguish the SS from another SS associated with a different SSID. Consider the case where the SS is a device and the device identifier space is 2^16, i.e., where device identifiers are 16 bits long. The 16-bit device identifier is truncated, hashed, or otherwise operated onto to obtain an abbreviated SSID, denoted as SSID-short, that fits into the numeric range 0 to 503, as defined for physical cell IDs in LTE networks.

This allows the SS to transmit PSS/SSS using the SSID-short in substantially the same manner that an eNB in an LTE network uses its physical cell ID to transmit PSS/SSS. Correspondingly, it allows a receiver to obtain the SSID-short from the received PSS/SSS in substantially the same manner as it would obtain the physical cell ID from the PSS/SSS it receives from an eNB. Further, to the extent that one or more transmission characteristics of the PSS/SSS are distinct for the type of SS—e.g., eNBs and UEs in an LTE network transmit PSS/SSS according to different symbol spacings, or in a different order, etc., the receiver can determine whether the identifier determined from the received PSS/SSS is a physical cell ID or an SSID-short.

In some embodiments, when the SSID is associated with or transmitted by a UE or other such wireless device 16, the SSID-short is used to generate the PSS/SSS and the full SSID is carried by the PD2DSCH or other control channel. In a further example, PD2DSCH carries an identity that, when combined with SSID-short, allows reconstruction of SSID. Thus, a receiver as contemplated would detect the SSID-short from the received synchronization signals, and then detect, derive or otherwise obtain the full SSID either from the PD2DSCH or from any combination of PSSID-short and the content of the PD2DSCH, or other signal transmitted in association with the synchronization signals.

In a further embodiment, some direct channels and/or signals—e.g., PD2DSCH, data channels, and scheduling assignments—are scrambled with a scrambling sequence that is a function at least of SSID-short. In a further example, the CRC of a packet carried by a direct channel is calculated or scrambled based on SSID-short. In a further example, the resource mapping of PD2DSCH or other direct channels/ signals is a function at least of SSID-short.

In a further example, if the identity to be carried by D2DSS is a cell-ID, the legacy mapping of cell-ID to PSS/SSS is reused even for D2DSS. The cell-ID may be carried by the PD2DSCH associated with the D2DSS. Additionally, D2D signals/channels—e.g., PD2DSCH, Scheduling Assignments, control channels, etc.—are scrambled with sequences derived from the cell-ID. It is assumed here that the receiver is able to distinguish between different types or categories of SSs, such as between D2DSS from a UE and NWSS from an eNB.

In particular, the example receiver detects the SSID-short address, e.g., from D2DSS, and finds the resources for direct channels/signals and/or descrambles the direct control channel/signal and/or calculates the CRC-checksum according to at least SSID-short. By doing this procedure, the receiver maximizes the probability of associating the correct PD2DSCH to D2DSS and randomizes interference.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of synchronization signal transmission from a wireless device configured for operation in a wireless communication network, the method comprising:
   obtaining an abbreviated identifier based on mapping a full identifier from a full identifier space into an abbreviated identifier space;
   generating Device-to-Device, D2D, synchronization signals as a function of the abbreviated identifier; and
   transmitting the D2D synchronization signals from the wireless device, for D2D synchronization use by one or more other wireless devices.

2. The method of claim 1, wherein the abbreviated identifier serves as an abbreviated device identifier for the wireless device, or wherein the abbreviated identifier serves as a synchronization reference identifier for the D2D synchronization signals.

3. The method of claim 1, wherein the abbreviated identifier space is the same as or overlaps with a cell identifier space comprising cell identifiers used for identifying cells in the network.

4. The method of claim 3, wherein generating the D2D synchronization signals as a function of the abbreviated identifier comprises generating the D2D synchronization signals using at least a subset of the same sequences used by base stations in the network for generating network synchronization signals as a function of respective ones of the cell identifiers.

5. The method of claim 4, wherein transmitting the D2D synchronization signals from the wireless device includes transmitting the D2D synchronization signals according to one or more transmission characteristics that distinguish them from the network synchronization signals, and thereby enable a receiver to distinguish the abbreviated identifier from the cell identifiers.

6. The method of claim 5, wherein transmitting the D2D synchronization signals according to the one or more transmission characteristics comprises at least one of: transmitting a primary D2D synchronization signal, PD2DSS, and a secondary D2D synchronization signal, SD2DSS, using a symbol spacing or symbol ordering distinct from a defined symbol spacing or defined symbol order used by the network base stations for transmitting primary and secondary network synchronization signals.

7. The method of claim 1, wherein mapping the full identifier from the full identifier space into the abbreviated identifier space comprises performing one or more mathematical operations on the full identifier, to obtain a reduced-magnitude value as said abbreviated identifier, wherein the reduced-magnitude value fits within the numeric range defined by the abbreviated identifier space.

8. The method of claim 7, wherein the one or more mathematical operations include one or more of: performing a truncation operation on the full identifier, performing a modulo-n operation on the full identifier, where n is an integer value corresponding to the numeric range of the abbreviated identifier space, and performing a hashing operation on the full identifier.

9. The method of claim 1, further comprising transmitting one or more signals in association with the D2D synchronization signals, wherein the one or more signals convey the full identifier or convey information enabling a receiver to reconstruct the full identifier from the abbreviated identifier.

10. The method of claim 1, further comprising transmitting one or more signals in association with the D2D synchronization signals, wherein the one or more signals are scrambled with the abbreviated identifier.

11. A wireless device configured for operation in a wireless communication network and comprising:
   a communication interface configured for communicating with network base stations and with other wireless devices using Device-to-Device, D2D, communications; and
   a processing circuit that is operatively associated with the communication interface and configured to:
      obtain an abbreviated identifier based on mapping a full identifier from a full identifier space into an abbreviated identifier;
      generate Device-to-Device, D2D, synchronization signals as a function of the abbreviated identifier; and
      transmit the D2D synchronization signals from the wireless device, for D2D synchronization use by one or more other wireless devices.

12. The wireless device of claim 11, wherein the abbreviated identifier serves as an abbreviated device identifier for the wireless device, or wherein the abbreviated identifier serves as a synchronization reference identifier for the D2D synchronization signals.

13. The wireless device of claim 11, wherein the abbreviated identifier space is the same as or overlaps with a cell identifier space comprising cell identifiers used for identifying cells in the network.

14. The wireless device of claim 11, wherein the processing circuit is configured to generate the D2D synchronization signals as a function of the abbreviated identifier by generating the D2D synchronization signals using at least a subset of the same sequences used by base stations in the network for generating network synchronization signals as a function of respective ones of the cell identifiers.

15. The wireless device of claim 14, wherein the processing circuit is configured to transmit the D2D synchronization signals according to one or more transmission characteristics that distinguish them from the network synchronization signals, and thereby enable a remote receiver to distinguish the abbreviated identifier from the cell identifiers.

16. The wireless device of claim 11, wherein the processing circuit is configured to transmit the D2D synchronization signals according to one or more transmission characteristics comprising at least one of an ordering characteristic, a spacing characteristic, and a mapping characteristic, which distinguishes from a defined ordering, spacing or mapping used by network base stations for the transmission of the network synchronization signals.

17. The wireless device of claim 11, wherein the processing circuit is configured to transmit a primary D2D synchronization signal, PD2DSS, and a secondary D2D synchronization signal, SD2DSS, using, as one or more transmission characteristics, a symbol spacing or symbol ordering that is distinct from a defined symbol spacing or defined symbol ordering used by the network base stations for transmitting primary and secondary network synchronization signals.

18. The wireless device of claim 11, wherein the processing circuit is configured to map the full identifier from the full identifier space into the abbreviated identifier space by performing one or more mathematical operations on the full identifier, to obtain a reduced-magnitude value as said abbreviated identifier, wherein the reduced-magnitude value fits within the numeric range defined by the abbreviated identifier space.

19. The wireless device of claim 18, wherein the one or more mathematical operations include one or more of: a truncation operation performed on the full identifier, a modulo-n operation performed on the full identifier, where n is an integer value corresponding to the numeric range of the abbreviated identifier space, and a hashing operation performed on the full identifier.

20. The wireless device of claim 11, wherein the processing circuit is configured to transmit one or more signals in association with the D2D synchronization signals, wherein the one or more signals convey the full identifier or convey information enabling a receiver to reconstruct the full identifier from the abbreviated identifier.

21. The wireless device of claim 11, wherein the processing circuit is configured to transmit one or more signals in association with the D2D synchronization signals, wherein the one or more signals are scrambled with the abbreviated identifier.

22. A method of synchronization signal processing implemented in a wireless device configured for operation in a wireless communication network and configured for Device-to-Device, D2D, communications, said method comprising:
  receiving synchronization signals generated as a function of an identifier;
  determining the identifier from the received synchronization signals;
  deciding whether the identifier is a cell identifier identifying a cell in the network or an abbreviated identifier associated with D2D synchronization signals, based on identifying one or more transmission characteristics of the received synchronization signals and determining whether the identified transmission characteristics are associated with network synchronization signals or are associated with D2D synchronization signals; and
  when the identifier is determined to be an abbreviated identifier, obtaining a corresponding full identifier from another D2D signal transmitted in association with the D2D synchronization signals.

23. The method of claim 22, wherein obtaining the corresponding full identifier comprises obtaining the full identifier from a control channel or other signal transmitted in association with the D2D synchronization signals.

24. The method of claim 22, wherein obtaining the corresponding full identifier comprises obtaining information from a control channel or other signal transmitted in association with the D2D synchronization signals, and reconstructing the full identifier from the obtained information and the abbreviated identifier.

25. The method of claim 22, further comprising using the abbreviated identifier to unscramble one or more signals transmitted in association with the D2D synchronization signals.

26. A wireless device configured for operation in a wireless communication network, said wireless device comprising:
  a communication interface configured for receiving network synchronization signals transmitted from network base stations and Device-to-Device, D2D, synchronization signals transmitted from wireless devices; and
  a processing circuit that is operatively associated with the communication interface and configured to:
    determine an identifier from received synchronization signals that were generated as a function of the identifier;
    decide whether the identifier is a cell identifier identifying a cell in the network or an abbreviated identifier associated with D2D synchronization signals, based on identifying one or more transmission characteristics of the received synchronization signals and determining whether the identified transmission characteristics are associated with network synchronization signals or are associated with D2D synchronization signals; and
    when the identifier is determined to be an abbreviated identifier, obtain a corresponding full identifier from another D2D signal transmitted in association with the D2D synchronization signals.

27. The wireless device of claim 26, wherein the processing circuit is configured to obtain the corresponding full identifier by obtaining the full identifier from a control channel or other signal transmitted in association with the D2D synchronization signals.

28. The wireless device of claim 26, wherein the processing circuit is configured to obtain the corresponding full identifier by obtaining information from a control channel or other signal transmitted in association with the D2D synchronization signals, and using the obtained information in conjunction with the abbreviated identifier to reconstruct the full identifier.

29. The wireless device of claim 26, wherein the processing circuit is configured to use the abbreviated identifier to unscramble one or more signals transmitted in association with the D2D synchronization signals.

* * * * *